(12) United States Patent
Take et al.

(10) Patent No.: US 8,837,111 B2
(45) Date of Patent: Sep. 16, 2014

(54) CAPACITOR ELEMENT AND CAPACITOR DEVICE HAVING THE SAME

(75) Inventors: Yoshinari Take, Tokyo (JP); Hidetoshi Masuda, Tokyo (JP); Kenichi Ota, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 62 days.

(21) Appl. No.: 13/422,694

(22) Filed: Mar. 16, 2012

(65) Prior Publication Data

US 2012/0300360 A1      Nov. 29, 2012

(30) Foreign Application Priority Data

Mar. 17, 2011   (JP) ................................. 2011-059139

(51) Int. Cl.
| | |
|---|---|
| *H01G 4/005* | (2006.01) |
| *H01G 4/228* | (2006.01) |
| *H01G 4/06* | (2006.01) |
| *H01G 4/38* | (2006.01) |
| *H01G 4/30* | (2006.01) |

(52) U.S. Cl.
CPC ...................................... *H01G 4/30* (2013.01)
USPC ..... 361/311; 361/303; 361/306.3; 361/321.2; 361/328; 361/329; 361/330

(58) Field of Classification Search
USPC ............ 361/303, 328–330, 306.3, 311, 321.2
See application file for complete search history.

(56) References Cited

U.S. PATENT DOCUMENTS

| | | | | |
|---|---|---|---|---|
| 3,838,320 | A * | 9/1974 | Klein ............................ | 361/303 |
| 7,295,420 | B2 * | 11/2007 | Kojima et al. ............. | 361/306.3 |
| 2009/0034162 | A1 * | 2/2009 | Yawata et al. ................. | 361/523 |

FOREIGN PATENT DOCUMENTS

| | | |
|---|---|---|
| JP | 61-29133 | 2/1986 |
| JP | 61-029133 A | 2/1986 |
| JP | 2003-249417 A | 9/2003 |
| JP | 2009-088034 A | 4/2009 |
| JP | 4493686 B2 | 6/2010 |

* cited by examiner

*Primary Examiner* — Eric Thomas
*Assistant Examiner* — Arun Ramaswamy
(74) *Attorney, Agent, or Firm* — Pillsbury Winthrop Shaw Pittman, LLP

(57) ABSTRACT

A capacitor forming unit according to one embodiment includes a dielectric plate with a plurality of through holes; a first conductor film formed on an upper surface of the dielectric plate; a first insulator film formed on the front end portion of the upper surface of the dielectric plate; a second conductor film formed on a lower surface of the dielectric plate; a second insulator film formed on the rear end portion of the lower surface of the dielectric plate; first electrode rods disposed in some of the through holes; and second electrode rods disposed in the remaining through holes where the first electrode rods are not disposed. The first electrodes are electrically connected to the first conductor film and electrically insulated from the second conductor film. The second electrode rods are electrically connected to the second conductor film and are electrically insulated from the first conductor film.

3 Claims, 20 Drawing Sheets

CAPACITOR ELEMENT AND CAPACITOR DEVICE HAVING THE SAME

CROSS REFERENCE TO RELATED APPLICATIONS

This is based upon and claims the benefit of priority from Japanese Patent Application No. 2011-059139, Filed Mar. 17, 2011, the entire contents of which are incorporated herein by reference.

BACKGROUND OF THE INVENTION

1. Field of the Invention

The present invention relates to a capacitor forming unit used to form a capacitor and to a capacitor having the capacitor forming unit.

2. Description of the Related Art

Several hundreds of stacked capacitors are used in one electronic device such as a portable telephone, a notebook computer, a video camera or a digital camera. Stacked capacitors have improved mountability onto circuit boards, and have a large capacity although they are small in size. For example, a stacked capacitor of the 0603 size having a capacitance of 0.47 µF (having a rated voltage of 4.0 V) is available in the market. Japanese Patent No. 4493686 discloses a stacked capacitor of a small size and a large capacitance.

In recent years, with the improvement in performance of various electronic devices, there has been a demand for capacitor of a large capacitance. In a stacked capacitor, a larger capacitance can be conceived by changing the number and thickness of internal electrode layers. However, a problem is that the external size increases with changes of the materials and thickness of the internal electrode layers and the dielectric layers.

Thus, there is a demand for a stacked capacitor of a large capacitance that is generally equal in size to the conventional stacked capacitors.

SUMMARY OF THE INVENTION

An embodiment according to the present invention provides a stacked capacitor of a large capacitance that is generally equal in size to the conventional stacked capacitors, and a capacitor forming unit for forming the stacked capacitor.

A capacitor forming unit according to an embodiment of the present invention includes a dielectric plate having a plurality of through holes formed in the thickness direction, a first conductor film formed on a region of an upper surface of the dielectric plate other than a front end portion of the upper surface, a first insulator film formed on the front end portion of the upper surface of the dielectric plate, a second conductor film formed on a region of a lower surface other than the rear end portion of the lower surface of the dielectric plate, a second insulator film formed on a rear end portion of the lower surface, one or more first electrode rods disposed in some of the plurality of through holes of the dielectric plate, the first electrode rods being electrically connected to the first conductor film and electrically insulated from the second conductor film, and one or more second electrode rods disposed in the through holes of the dielectric plate in which the first electrode rod is not disposed, the second electrode rods being electrically connected to the second conductor film and electrically insulated from the first conductor film.

A capacitor according to an embodiment of the present invention includes a unit stack composed of a plurality of the above-described capacitor, where first (or second) conductor films of adjacent capacitor forming units face each other and are electrically connected to each other, forming units according to an embodiment of the present invention stacked one on top of another, an insulating cover film formed of an insulator material and formed on upper, lower, left and right surfaces of the unit stack, a front external terminal connected to a front surface of the unit stack, and a rear external terminal connected to a rear surface of the unit stack. The front end of the second conductor film is exposed in the front surface of the unit stack, and the rear end of the first conductor film is exposed in the rear surface of the unit stack. The front external terminal electrically connects to the front end portion of the second conductor film exposed in the front of the unit stack. The rear external terminal electrically connects to the rear end portion of the first conductor film exposed in the rear of the unit stack.

A capacitor according to another embodiment of the present invention includes a unit stack composed of a plurality of the above-described capacitor, where a first conductor film of a capacitor forming unit and a second conductor film of the adjacent capacitor forming unit faces each other via a dielectric layer and are electrically insulated to each other, forming units according to an embodiment of the present invention stacked one on top of another, an insulating cover film formed of an insulator material and formed on upper, lower, left and right surfaces of the unit stack, a front external terminal connected to a front surface of the unit stack, and a rear external terminal connected to a rear surface of the unit stack. The front end of the second conductor film is exposed in the front surface of the unit stack, and the rear end of the first conductor film is exposed in the rear surface of the unit stack. The front external terminal electrically connects to the front end portion of the second conductor film exposed in the front of the unit stack. The rear external terminal electrically connects to the rear end portion of the first conductor film exposed in the rear of the unit stack.

According to the embodiment of the present invention, a stacked capacitor equal in size to the conventional stacked capacitor and having a high withstand voltage and a high capacitance and a capacitor forming unit for forming the capacitor can be provided. The above-described object and other objects, features, functions and effects of the present invention will be apparent from the following detailed description and the accompanying drawings.

DETAILED DESCRIPTION OF THE PREFERRED EMBODIMENTS

Figure 1:
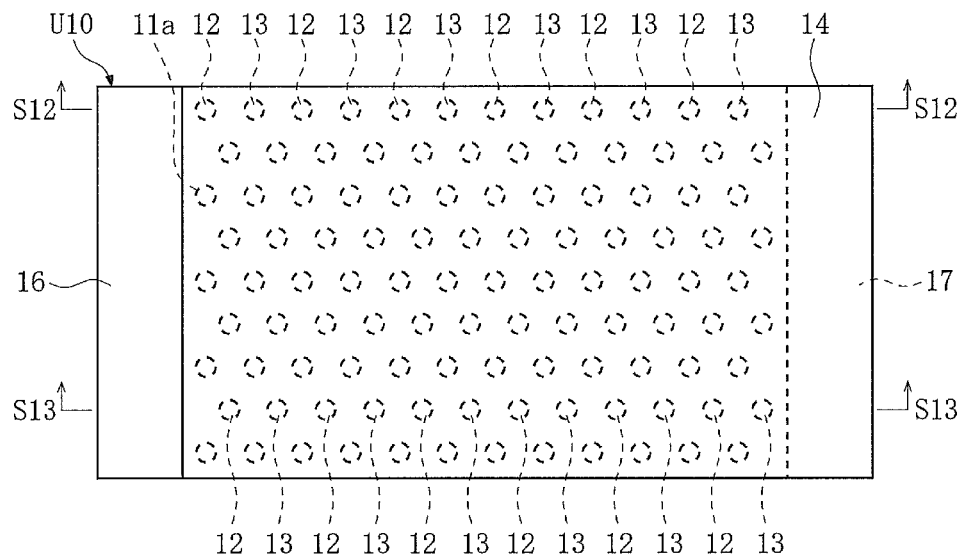
FIG. 1 is a top view of a capacitor forming unit according to an embodiment of the present invention.
Figure 2:
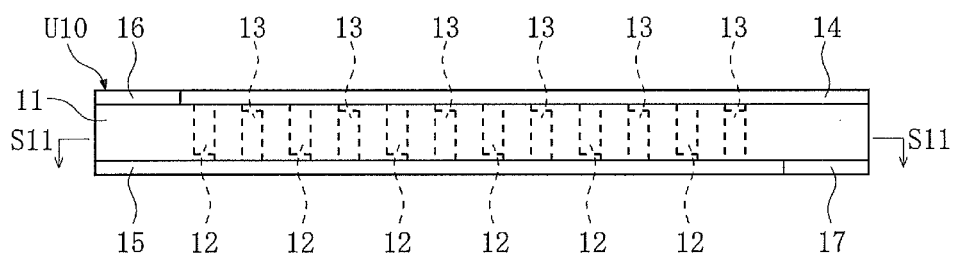
FIG. 2 is a left side view of the unit shown in FIG. 1.

A capacitor forming unit U10 according to an embodiment of the present invention will be described with reference to FIGS. 1 to 9. In this specification, the left, right, bottom, top, front and rear sides as viewed in FIG. 1 will be referred to as the front, rear, left, right, top and bottom, respectively, for ease of description. The sides shown in FIGS. 2 to 9 are also designated in accordance with this orientation.

The unit U10 according to an embodiment of the present invention shown in FIGS. 1 to 5 has a dielectric plate 11, first electrode rods 12, second electrode rods 13, a first conductor film 14, a second conductor film 15, a first insulator film 16, and a second insulator film 17. By using this unit U10, a capacitor of the 0603 size for example can be made. The capacitor size is not limited to the 0603 size. For example, a capacitor of a size such as the 0402 size smaller than the 0603 size can be made by reducing the front-rear size and/or the left-right size of the unit U10. A capacitor of a size such as the 3225 size or the 4532 size larger than the 0603 size can also be made by increasing the front-rear size or the left-right size of the unit U10.

The dielectric plate 11 is formed so as to have a rectangular contour as seen in a top view. The dielectric plate 11 is formed of an oxide (=dielectric) of a valve metal such as Al, Ta, Nb, Ti, Zr, Hf, Zn, W or Sb. The thickness of the dielectric plate 11 is 50 to 150 μm for example. The dielectric plate 11 is formed so as to have a front-rear size slightly smaller than 0.6 mm and a left-right size slightly smaller than 0.3 mm.

In a portion of the dielectric plate 11 other than a portion in the vicinity of the front surface and a portion in the vicinity of the rear surface, a plurality (according to the diagram, 108 pieces in total) of through holes 11a having a circular cross section and extending in the thickness direction are formed in a predetermined array. The through holes 11a are arranged to be of each center positioned at the vertices of regular hexagons for example. In the example shown in FIG. 3, twenty-four columns of through holes 11a each consisting of five or four through holes 11a arranged along the left-right direction are provided. Each through hole 11a is formed so that its inside diameter is 15 to 45 nm. While the embodiment having a hundred and eight through holes 11a is illustrated, any number of through holes 11a may be provided in the dielectric plate 11.

Figure 3:
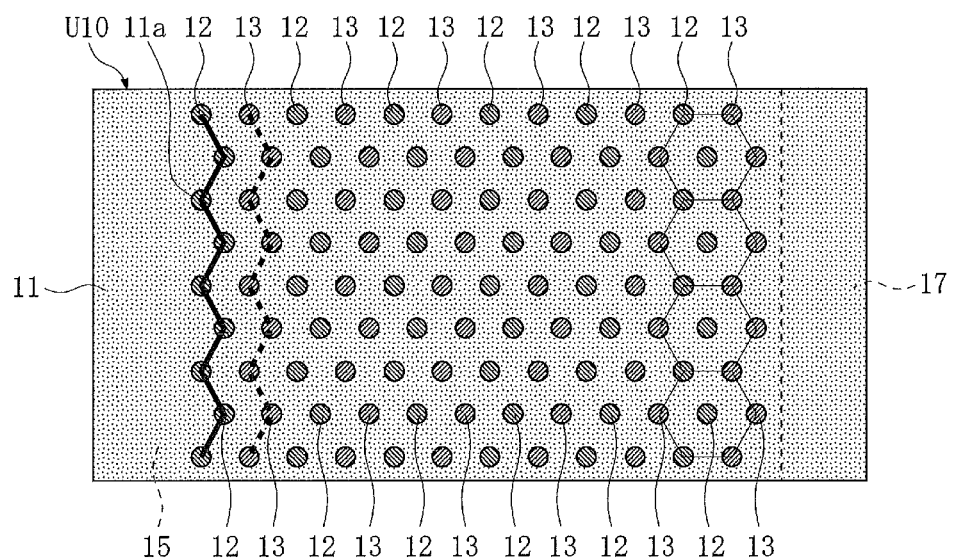
FIG. 3 is a sectional view taken along line S11-S11 in FIG. 2.
Figure 4:
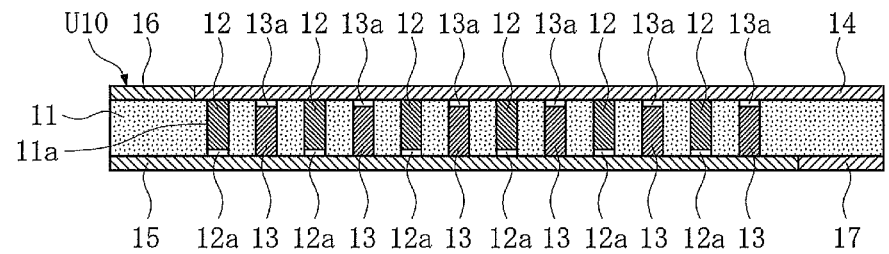
FIG. 4 is a sectional view taken along line S12-S12 in FIG. 1.
Figure 5:
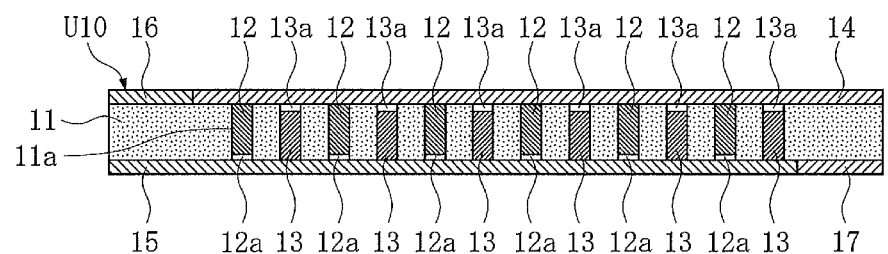
FIG. 5 is a sectional view taken along line S13-S13 in FIG. 1.

The first electrode rods 12 fill part (fifty-four in the illustrated example) of the plurality of through holes 11a formed in the dielectric plate 11. Each first electrode rod 12 is formed of a conductor material selected from pure metals such as Cu, Ni, Co, Cr, Ag, Au, Pd, Fe, Sn, Pb and Pt and alloys of some of these metals. As shown in FIGS. 4 and 5, the upper end of each first electrode rod 12 is flush with the upper surface (one through hole exposure surface) of the dielectric plate 11, while the lower end of each first electrode rod 12 is positioned by being slightly recessed from the lower surface (the other through hole exposure surface) of the dielectric plate 11. That is, a vacant space having a top-bottom size of 5 to 15 μm is formed as an insulating gap 12a between the lower end of each first electrode rod 12 and the lower surface of the dielectric plate 11. This vacant space may be filled with an insulator material such as polyimide and this filler may be formed as insulating gap 12a. As shown in FIG. 3, the first electrode rods 12 are provided in the first, second, fifth, sixth, ninth, tenth, thirteenth, fourteenth, seventeenth, eighteenth, twenty-first and twenty-second columns from the front in the twenty-four columns of through holes 11a. Accordingly, the first electrode rods 12 are disposed at positions corresponding to the vertices of solid wave lines shown in FIG. 3.

The second electrode rods 13 fill the interiors of the through holes 11a not filled with the first electrode rods 12 (fifty-four through holes 11a in the illustrated example) in the plurality of through holes 11a formed in the dielectric plate 11. Each second electrode rod 13 is formed of a conductor material selected from pure metals such as Cu, Ni, Co, Cr, Ag, Au, Pd, Fe, Sn, Pb and Pt and alloys of some of these metals. As shown in FIGS. 4 and 5, the lower end of each second electrode rod 13 is flush with the lower surface of the dielectric plate 11, while the upper end of each second electrode rod 13 is positioned by being slightly recessed from the upper surface of the dielectric plate 11. That is, a vacant space having a top-bottom size of 5 to 15 μm is formed as an insulating gap 13a between the upper end of each second electrode rod 13 and the upper surface of the dielectric plate 11. This vacant space may be filled with an insulator material such as polyimide and this filler may be formed as insulating gap 13a. As shown in FIG. 3, the second electrode rods 13 are provided in the third, fourth, seventh, eighth, eleventh, twelfth, fifteenth, sixteenth, nineteenth, twentieth, twenty-third and twenty-fourth columns from the front in the twenty-four columns of through holes 11a. Accordingly, the second electrode rods 13 are disposed at positions corresponding to the vertices of dashed wave lines shown in FIG. 3. Thus, the array of the first electrode rods 12 indicated by the solid wave lines in FIG. 3 and the array of the second electrode rods 13 indicated by the dashed wave lines are alternately located in the front-rear direction of the dielectric plate 11. While fifty-four first electrode rods 12 and fifty-four second electrode rods 13 are provided in the example shown in FIG. 3, it is not necessarily required that the number of first electrode rods 12 and the number of second electrode rods 13 be equal to each other.

The first conductor film 14 is formed so as to adhere to a rectangular region of the upper surface of the dielectric plate 11 other than a front end portion of the upper surface. The first conductor film 14 is formed of a conductor material selected from pure metals such as Cu, Ni, Cr, Ag, Au, Pd, Fe, Sn, Pb, Pt, Ir, Rh, Ru, Al and Ti and alloys of some of these metals. The thickness (top-bottom size) of the first conductor film 14 is 0.5 to 1.5 μm. In an embodiment, the left-right size of the first conductor film 14 is the same as that of the dielectric plate 11, while the front-rear size of the first conductor film 14 is 85/100 to 95/100 of the front-rear size of the dielectric plate 11. As shown in FIGS. 4 and 5, the lower surface of the first conductor film 14 is electrically connected to the upper end of each first electrode rod 12 but is electrically insulated from the upper end of each second electrode rod 13, with the insulating gap 13a formed therebetween. The first conduct film 14 is positioned with which rear surface being flush with the rear surface of the dielectric plate 11. In an embodiment, the first conductor film 14 includes Ti film and Cu film covering the Ti film and may be formed so as to have any number of layers by using a material capable of adhering firmly to the dielectric plate 11 and making a good electrical connection to each first electrode rod 12.

The second conductor film 15 is formed so as to adhere to a rectangular region of the lower surface of the dielectric plate 11 other than a rear end portion of the lower surface. The second conductor film 15 is formed of a conductor material selected from pure metals such as Cu, Ni, Cr, Ag, Au, Pd, Fe, Sn, Pb, Pt, Ir, Rh, Ru, Al and Ti and alloys of some of these metals. The thickness (top-bottom size) of the second conductor film 15 is 0.5 to 1.5 μm. In an embodiment, the left-right size of the second conductor film 15 is the same as that of the dielectric plate 11, while the front-rear size of the second conductor film 15 is 85/100 to 95/100 of the front-rear size of the dielectric plate 11. As shown in FIGS. 4 and 5, the upper surface of the second conductor film 15 is electrically connected to the lower end of each second electrode rod 13 but is electrically insulated from the lower end of each first electrode rod 12, with the insulating gap 12a formed therebetween. The second conductive film 15 is positioned with which front surface being flush with the front surface of the dielectric plate 11. In an embodiment, the second conductor film 15 includes Ti film and Cu film covering the Ti film and may be formed so as to have any number of layers by using any material capable of adhering firmly to the dielectric plate 11 and making a good electrical connection to each second electrode rod 13.

The first insulator film 16 is formed so as to adhere to a rectangular region in a front end portion of the upper surface of the dielectric plate 11 where the first conductor film 14 is not formed. The rear surface of the first insulator film 16 adheres to the front surface of the first conductor film 14. In an embodiment, the first insulator film 16 is formed of an insulator material such as an epoxy resin, a phenolic resin, unsaturated polyester or polyimide, and the thickness of the first insulator film 16 is the same as that of the first conductor film 14. The left-right size of the first insulator film 16 is the same as that of the dielectric plate 11. The front-rear size of the first insulator film 16 is equal to the result of subtracting the front-rear sizes of the first conductor film 14 from the front-rear size of the dielectric plate 11. As shown in FIGS. 4 and 5, the front surface of the first insulator film 16 is flush with the front surface of the dielectric plate 11.

The second insulator film 17 is formed so as to adhere to a rectangular region in a rear end portion of the lower surface of the dielectric plate 11 where the second conductor film 15 is not formed. The front surface of the second insulator film 17 adheres to the rear surface of the second conductor film 15. In an embodiment, the second insulator film 17 is formed of an insulator material such as an epoxy resin, a phenolic resin, unsaturated polyester or polyimide, and the thickness of the second insulator film 17 is the same as that of the first conductor film 14. The left-right size of the second insulator film 17 is the same as that of the dielectric plate 11. The front-rear size of the second insulator film 17 is equal to the result of subtracting the front-rear sizes of the second conductor film 15 and the first insulator film 16 from the front-rear size of the dielectric plate 11. As shown in FIGS. 4 and 5, the rear surface of the second insulator film 17 is flush with the rear surface of the dielectric plate 11.

As described above, the unit U10 is constructed so that the first electrode rods 12 filling the through holes 11a in the dielectric plate 11 are electrically connected to the first conductor film 14 and so that the second electrode rods 13 are electrically connected to the second conductor film 15. In this construction, the first electrode rods 12 and the second electrode rods 13 are disposed so as not to directly contact each other.

Figure 6:
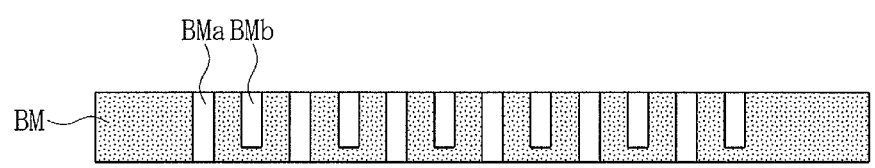
FIG. 6 is a diagram for explaining an example of a method of making the capacitor forming unit shown in FIG. 1.

An example of a method of making the unit U10 will be described. As shown in FIG. 6, a plate base member BM for the dielectric plate 11 is first prepared. Pits provided as a basis for anodization are formed in the plate base member BM. Subsequently, two kinds of holes BMa and BMb differing in depth from each other are formed by two anodization process steps. The holes BMa are formed so as to extend through the plate base member BM. The holes BMb are formed so as not to extend through the plate base member BM.

Figure 7:
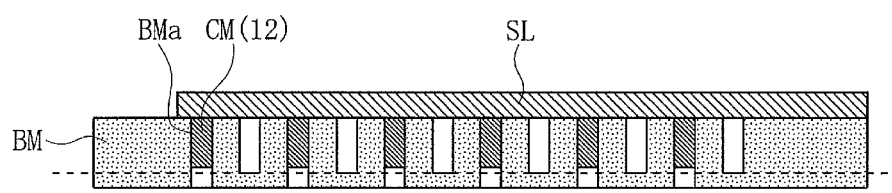
FIG. 7 is a diagram for explaining the example of the method of making the capacitor forming unit shown in FIG. 1.

Subsequently, as shown in FIG. 7, a seed layer SL formed of Cu for example is formed on the upper surface of the plate base member BM by physical vapor deposition (PVD) processing. Next, the holes BMa are filled with a conductor material CM for the first electrode rods 12 by electroplating processing using the seed layer SL.

Figure 8:
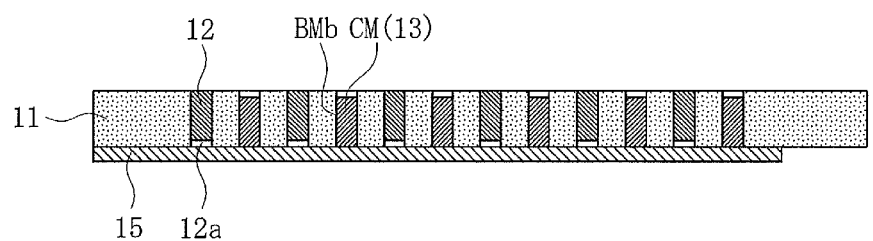
FIG. 8 is a diagram for explaining the example of the method of the unit shown in FIG. 1.

Subsequently, as shown in FIG. 8, the seed layer SL is removed from the plate base member BM, and a lower surface side portion (a portion below the dashed line in FIG. 7) of the plate base member BM is removed to open the lower ends of the holes BMb, thereby obtaining the dielectric plate 11. Next, the second conductor film 15 is formed on the lower surface of the dielectric plate 11 by PVD processing. Next, the holes BMb are filled with a conductor material CM for the second electrode rods 13 by electroplating processing using the second conductor film 15.

Figure 9:
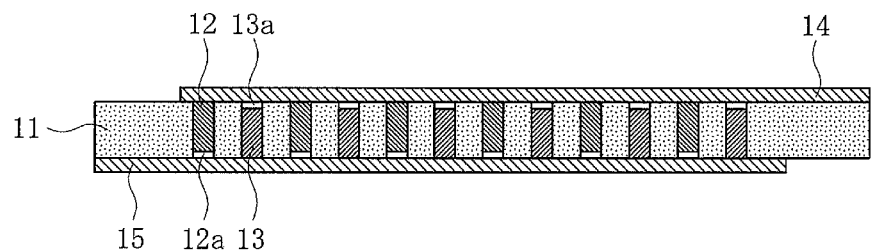
FIG. 9 is a diagram for explaining the example of the method of making the capacitor forming unit shown in FIG. 1.

Subsequently, as shown in FIG. 9, the first conductor film 14 is formed on the upper surface of the dielectric plate 11 by PVD processing.

Subsequently, the first insulator film 16 is formed on the lower surface front end portion of the dielectric plate 11; and the second insulator film 17, on the upper surface rear end portion. Each insulator film is formed by applying an insulating material to the corresponding region and by curing the applied insulating material.

In another embodiment of the present invention, through holes 11a may also be formed in the front and rear end portions of the dielectric plate 11. The through holes 11a provided in the font and rear end portions may also be filled with the conductor material CM. The through holes 11a provided in the font and rear end portions may be masked before the step shown in FIG. 7 to avoid filling the through holes 11a provided in the font and rear end portions with the conductor material CM. The through holes 11a provided in the font and rear end portions may be filled not with the conductor material CM but with an insulator material.

Figure 10:
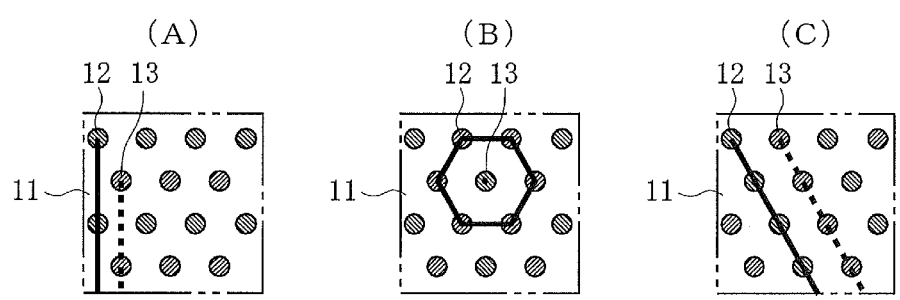
FIG. 10 is a diagram showing capacitor forming units according to other embodiments of the present invention.

FIGS. 10(A) to 10(C) show other examples of the array of first electrode rods 12 and second electrode rods 13. An array may be adopted in which, as shown in FIG. 10(A), first electrode rods 12 are disposed on a straight line in the left-right direction indicated by a solid line, and second electrode rods 13 are also disposed on a straight line in the left-right direction indicated by a dashed line. In this case, the linear array indicated by a solid line of first electrode rods 12 and the linear array indicated by a dash line of second electrode rods 13 are alternately located in the front-rear direction. Also, another array can be adopted in which, as shown in FIG. 10(B), first electrode rods 12 are disposed at positions corresponding to the vertices of a regular hexagon indicated by a solid line, while a second electrode rod 13 is disposed at a position corresponding to the center of the regular hexagon. Still another array may be adopted in which, as shown in FIG. 10(C), first electrode rods 12 are disposed on a straight line indicated by a solid line slanting at about 30 degrees from the left-right direction, and second electrode rods 13 are also disposed on a straight line indicated by a dashed line slanting at about 30 degrees from the left-right direction. In this case, the solid straight line on which the first electrode rods 12 are disposed and the dashed line on which the second electrode rods 13 are disposed are alternately located.

Figure 11:
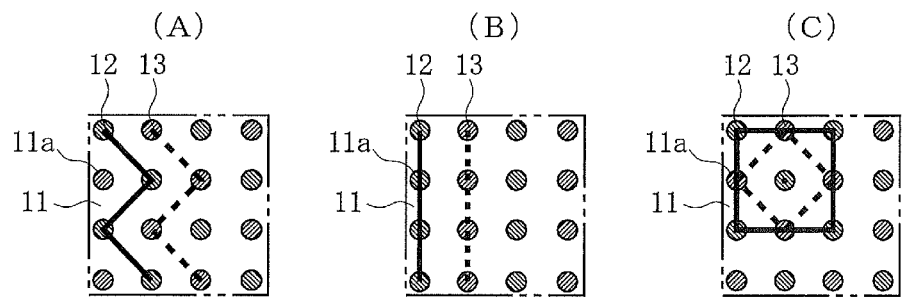
FIG. 11 is a diagram showing capacitor forming units according to other embodiments of the present invention.

FIGS. 11(A) to 11(C) show other examples of the array of through holes 11a. In an embodiment, as illustrated, through holes 11a may be disposed in upright square lattice form. An array of through holes 11a in such upright square lattice form may be such that, for example, as shown in FIG. 11(A), first electrode rods 12 are disposed at positions corresponding to the vertices of a solid wave line, while second electrode rods 13 are disposed at positions corresponding to the vertices of a dashed wave line. The solid wave line on which the first electrode rods 12 are disposed and the dashed wave line on which the second electrode rods 13 are disposed are alternately located. Another array may be adopted in which, as shown in FIG. 11(B), first electrode rods 12 are disposed on a straight line in the left-right direction indicated by a solid line, and second electrode rods 13 are also disposed on a straight line in the left-right direction indicated by a dashed line. In this case, the solid straight line on which the first electrode rods 12 are disposed and the dashed straight line on which the second electrode rods 13 are disposed are alternately located. Still another array may be adopted in which, as shown in FIG. 11(C), first electrode rods 12 are disposed at positions corresponding to the vertices of a square indicated by a solid line, while a second electrode rod 13 is disposed at a position corresponding to the vertices of a square indicated by a dashed line. First electrode rods 12 and second electrode rods 13 may be disposed in conformity with any regular array other than those described above. First electrode rods 12 and second electrode rods 13 may be alternatively disposed irregularly.

A capacitor C20 according to an embodiment of the present invention will be described with reference to FIGS. 12 to 18. In an embodiment of the present invention, the capacitor C20 has four units U10. In this specification, the left, right, front, rear, top and bottom sides as viewed in FIG. 13 will be referred to as the front, rear, left, right, top and bottom, respectively, for ease of description. The sides shown in FIGS. 12 and 15 to 18 are also designated in accordance with this orientation.

Figure 12:
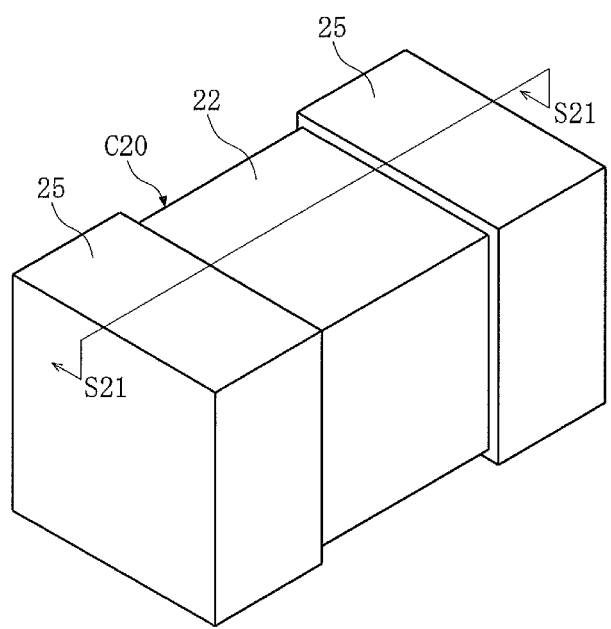
FIG. 12 is an external perspective view of a capacitor according to an embodiment of the present invention.
Figure 13:
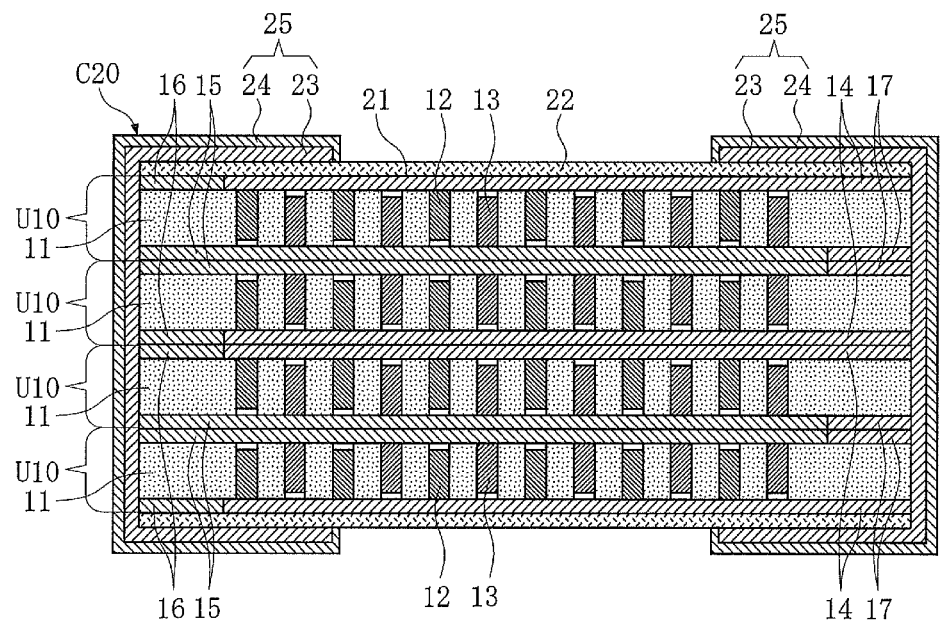
FIG. 13 is a sectional view of capacitor taken along line S21-S21 in FIG. 12.

As shown in FIGS. 12 and 13, the capacitor C20 according to an embodiment of the present invention has a unit stack 21 in the form of a rectangular block, an insulating cover film 22 covering the unit stack 21 and a pair of external terminals 25 each formed of a base conductor film 23 and a surface conductor film 24. The capacitor C20 is configured to interchangeable with various conventional stacked capacitors. In an embodiment, the capacitor C20 is constructed in the 0603 size. The capacitor C20 in the 0603 size has a front-rear size of 0.6 mm and a left-right size of 0.3 mm.

Figure 19:
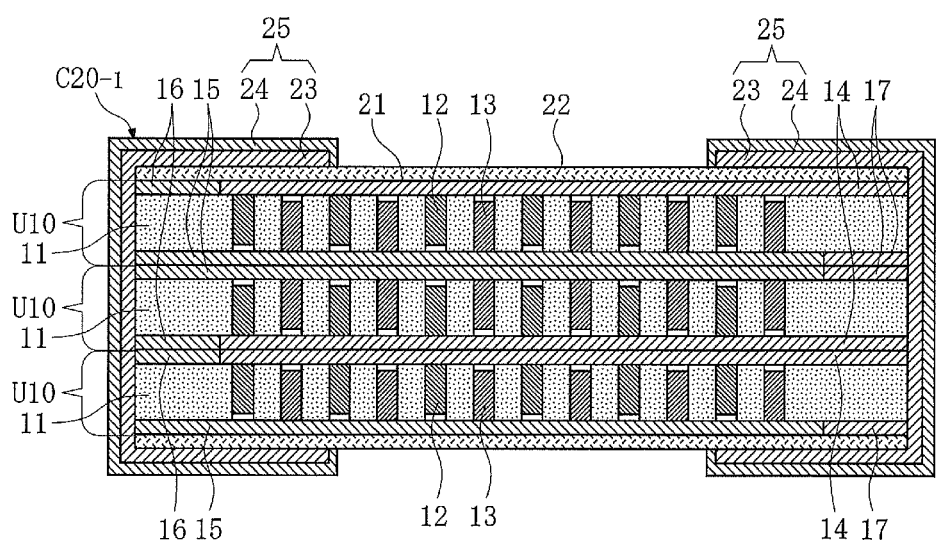
FIG. 19 is a sectional view of a capacitor according to another embodiment of the present invention.

The unit stack 21 is constructed by stacking four number of the above-described units U10 in the top-bottom direction so that these units are integrally combined. In the unit stack 21, the uppermost unit U10 is disposed so that the second conductor film 15 of the uppermost unit U10 faces the second conductor film 15 of the unit U10 in the second position from the top. Also, the uppermost unit U10 is disposed so that the first insulator film 17 of the uppermost unit U10 faces the second insulator film 17 of the unit U10 in the second position from the top. The unit U10 in the second position from the top is deposed so that the first conductor film 14 of the unit U10 in the third position from the top faces the first insulator film 16 of the unit U10 in the third position from the top. Also, the unit U10 in the third position from the top is deposed so that the second conductor film 15 faces the second conductor film 15 of the unit U10 in the fourth position from the top. The number of units U10 constituting the unit stack 21 is not limited to four. The unit stack 21 may have any number of units U10 equal to or larger than two. For example, a capacitor C20-1 having three units U10 can be made by using three units U10 constituting the unit stack 21, as shown in FIG. 19.

The second conductor film 15 of each unit U10 is electrically connected to the second conductor film 15 of the adjacent unit U10. This electrical connection can be realized by a direct bonding method such as diffusion junction (thermocompression bonding), an indirect bonding method using an electroconductive bonding material such as solder or an electroconductive adhesive, and/or any bonding method other than these. In an embodiment, use of a direct bonding method enables reducing the size of the capacitor C20 in comparison with use of an indirect method.

The front extreme ends of the second conductor film 15 and the first insulator film 16 of each unit U10 are exposed in the front surface of the unit stack 21, while the rear extreme ends of the first conductor film 14 and the second insulator film 17 are exposed in the rear surface of the unit stack 21.

The insulating cover film 22 is formed so as to cover the left, right and upper surfaces of the unit stack 21 and cover the bottom surface of the unit stack 21. The insulating cover film 22 is formed of an insulator material such as an epoxy resin, a phenolic resin, unsaturated polyester or polyimide. The thickness of the insulating cover film 22 is 1.5 to 4.5 μm.

As shown in FIG. 13, the base conductor film 23 constituting the external terminal 25 on the front side is formed so as to continuously cover the front surface of the unit stack 21 and front end portions of the left, right, upper, and lower surfaces of the insulating cover film 22. The base conductor film 23 on the rear side constituting the external terminal 25 on the rear side is formed so as to continuously cover the rear surface of the unit stack 21 and rear end portions of the left, right, upper, and lower surfaces of the insulating cover film 22. Each base conductor film 23 in an embodiment is formed of an electroconductive plastic and its thickness is 5 to 15 μm. The electroconductive plastic has a plastic component constituted of an epoxy resin, a phenolic resin, unsaturated polyester or polyimide for example. The electroconductive plastic has a metal component constituted of Ag particles, Pd particles, Cu particles, Ni particles or the like. Each base conductor film 23 may alternatively be formed of a conductor material such as Ti, Cu, Ni, Ag or Pd. In an embodiment, each base conductor film 23 is formed so as to have a two-layer structure formed of a Ti film and a Cu film covering the Ti film. Each base conductor film 23 may be formed so as to have any number of layers by using any material capable of making a good electrical connection to the first conductor film 14 or the second conductor film 15 and capable of achieving good adhesion to the unit stack 21 or the insulating cover film 22. As shown in FIG. 13, the base conductor film 23 on the front side is electrically connected to the rear extreme ends of the second conductor film 15 of each unit U10 contained in the stack unit 21 while the inner surface of the base conductor film 23 on the rear side is electrically connected to the rear end portion of the first conductor film 14 of the uppermost unit U10. Since each base conductor film 23 contains an amount of a metal component (e.g., 80 to 90 wt %) suitable for securing electroconductivity, it is capable of making a good electrical connection to the first conductor film 14 or the second conductor film 15. Since each base conductor film 23 contains an amount of a plastic component (e.g., 10 to 20 wt %) suitable for securing adhesion, it is capable of adhering to the unit stack 21 and the insulating cover film 22.

The surface conductor film 24 on the front side forming the external terminal 25 on the front side is formed so as to cover the base conductor film 23 on the front side. The surface conductor film 24 on the rear side forming the external terminal 25 on the rear side is formed so as to cover the base conductor film 23 on the rear side. In an embodiment, each surface conductor film 24 is formed of a conductor material such as Ni, Sn or Au and its thickness is 5 to 15 μm. As shown in FIG. 13, the inner surface of the surface conductor film 24 on the front side is electrically connected to the surface of the base conductor film 23 on the front side, while the inner surface of the surface conductor film 24 on the rear side is electrically connected to the surface of the base conductor film 23 on the rear side. Each surface conductor film 24 may have a two-layer structure formed of a Ni film and a Sn film covering the Ni film. Each surface conductor film 24 may be formed so as to have any number of layers by using any material capable of making a good electrical connection to the base conductor film 23 and capable of achieving good soldering to a pad on a circuit board.

Figure 14:
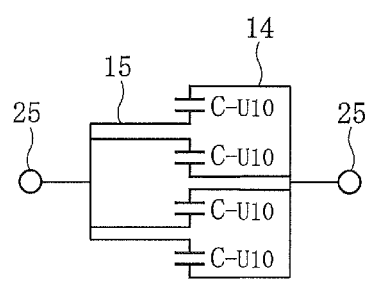
FIG. 14 is an equivalent circuit diagram of the capacitor shown in FIG. 12.
Figure 20:
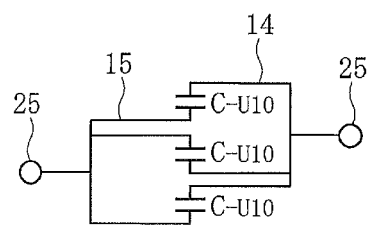
FIG. 20 is an equivalent circuit diagram of the capacitor shown in FIG. 19.

FIG. 14 shows an equivalent circuit diagram thus constructed. As illustrated, in the configuration shown by the equivalent circuit of the capacitor C20, four capacitors of a capacitance C-U10 each corresponding to the unit U10 are connected in parallel between the pair of external terminals 25. FIG. 20 shows an equivalent circuit diagram of the capacitor C20-1 shown in FIG. 19. As illustrated, in the configuration shown by the equivalent circuit of the capacitor C20-1, three capacitors of a capacitance C-U10 each corresponding to the unit U10 are connected in parallel between the pair of external terminals 25.

Figure 15:
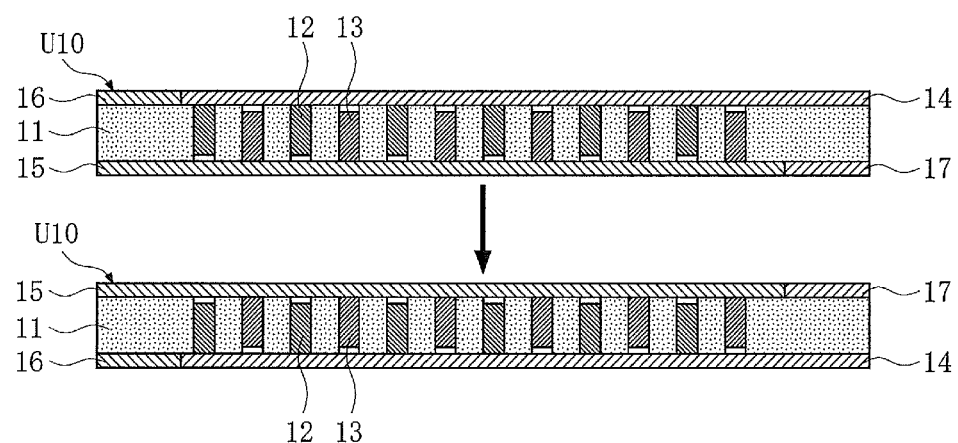
FIG. 15 is a diagram for explaining an example of a method of manufacturing the capacitor shown in FIG. 12.
Figure 16:
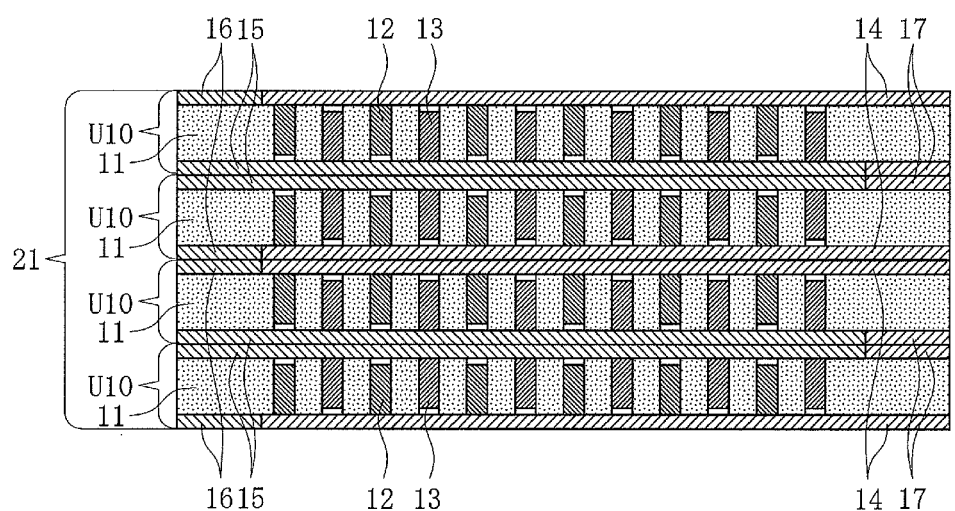
FIG. 16 is a diagram for explaining the example of the method of manufacturing the capacitor shown in FIG. 12.

To manufacture the capacitor C20, the four units U10 for forming the unit stack 21 are first prepared. The units U10 may be individually made. For reduction in manufacturing cost, a process may alternatively be performed in which a unit base member having units U10 continuously formed therein is produced and the individual units U10 are cut out from the unit base member. Next, as shown in FIGS. 15 and 16, the four units U10 are disposed so that: the upper surfaces of the second conductor film 15 and second insulator film 17 of the lowermost unit U10 respectively faces the lower surfaces of the second conductor film 15 and the second insulator film 17 of the unit U10 in the second position from the bottom; and the upper surfaces of the first conductor film 14 and the first insulator film 16 of the unit U10 in the second position from the bottom respectively faces the lower surfaces of the first conductor film 14 and the first insulator film 16 of the unit U10 in the third position from the bottom; and the upper surfaces of the second conductor film 15 and the second insulator film 17 of the unit U10 in the third position from the bottom respectively faces the lower surfaces of the second conductor film 15 and the second insulator film 17 of the unit U10 in the fourth position from the bottom. Then, the adjoining units U10 disposed in this way are joined together to form the unit stack 21.

Figure 17:
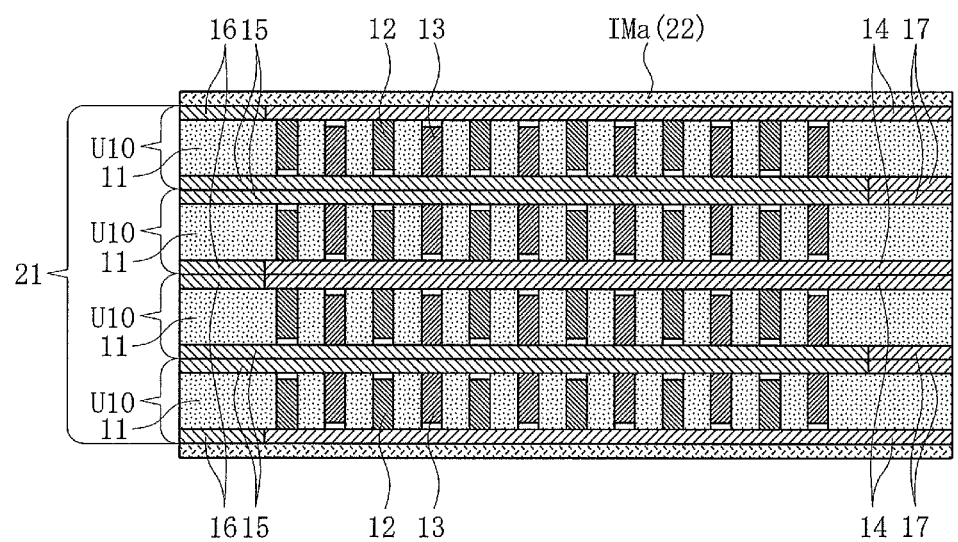
FIG. 17 is a diagram for explaining the example of the method of manufacturing the capacitor shown in FIG. 12.

Subsequently, as shown in FIG. 17, an insulator material 1Ma (not cured yet) is applied to cover the left, right and upper surfaces of the unit stack 21 by using an applicator such as a roller applicator or a spray applicator, and the applied insulator material 1Ma is cured, thus making the insulating cover film 22.

Figure 18:
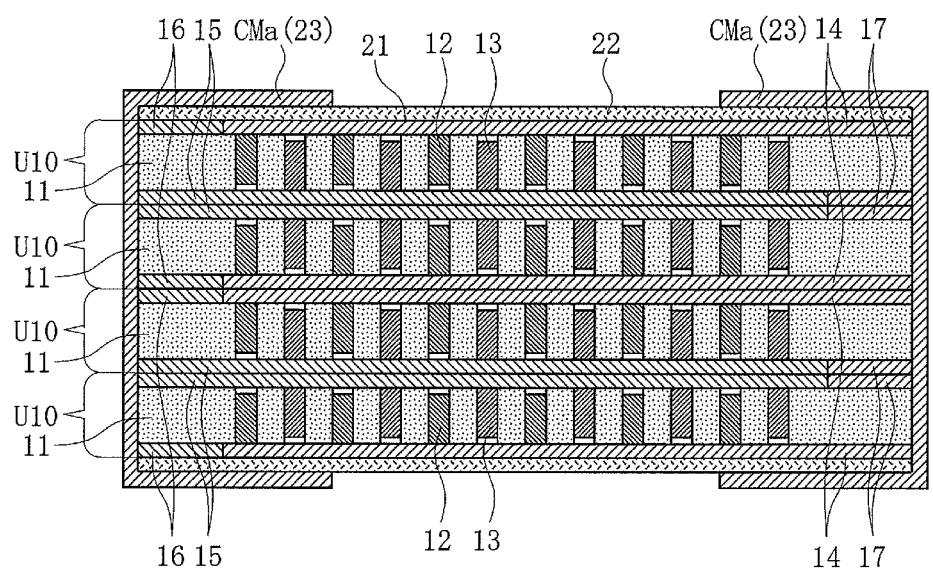
FIG. 18 is a diagram for explaining the example of the method of manufacturing the capacitor shown in FIG. 12.

Subsequently, as shown in FIG. 18, an electroconductive plastic material CMa (not cured yet) is applied to the front surface of the unit stack 21 and to the front end portions of the left, right, upper and lower surfaces of the insulating cover film 22 by using an applicator such as a roller applicator or a dip applicator. Also, an electroconductive plastic material CMa (not cured yet) is applied to the rear surface of the unit stack 21 and to the rear end portions of the left, right, upper and lower surfaces of the insulating cover film 22. Each electroconductive plastic material CMa is thereafter cured, thus making each base conductor film 23.

Subsequently, the surface conductor film 24 is made on the surfaces of the base conductor films 23 by electroplating processing. In a case where the number of layers in the surface conductor film 24 is two or more, electroplating processings respectively made suitable for the layers are successively performed, thus obtaining the capacitor C20.

A capacitor C30 according to an embodiment of the present invention will be described with reference to FIGS. 21 and 22. In this specification, the left, right, front, rear, top and bottom sides as viewed in FIG. 21 will be referred to as the front, rear, left, right, top and bottom, respectively, for ease of description.

Figure 21:
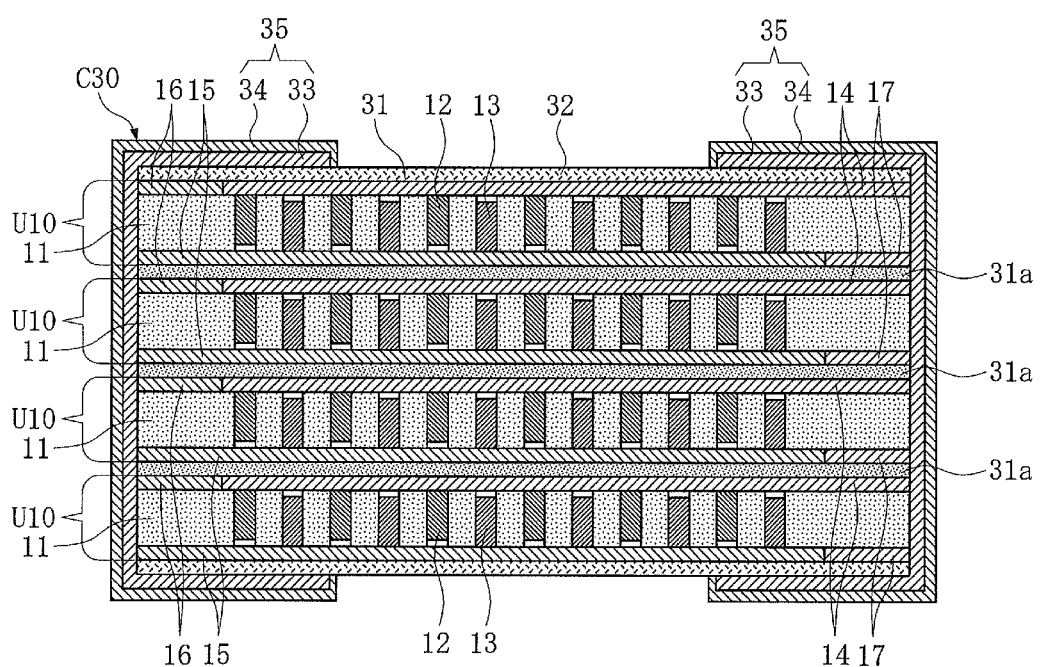
FIG. 21 is a sectional view of a capacitor according to another embodiment of the present invention.

As shown in FIG. 21, the capacitor C30 according to an embodiment of the present invention has a unit stack 31 in the form of a rectangular block, an insulating cover film 32, and a pair of external terminals 35 each formed of base conductor film 33 and a surface conductor film 34. The capacitor C30, for example, is configured to be interchangeable with various conventional 0603 size stacked capacitors, but which size is not limited to this. The capacitor C30 in the 0603 size has a front-rear size of 0.6 mm and a left-right size of 0.3 mm.

The unit stack 31 is constructed by stacking, for example, four number of the above-described unit U10 in the top-bottom direction so that these units are integrally combined. In an embodiment of this present invention, the uppermost unit U10 is disposed so that the second conductor film 15 of the utmost unit U10 faces the first conductor film 14 of the unit U10 in the second position from the top via insulating layer 31a. The unit U10 in the second position from the top and the unit U10 in the third position from the top are disposed so as to have the same positional relationship as that between the uppermost unit 10 and the unit 10 in the second position from the top. The unit U10 in the third position from the top and the unit U10 in the fourth position from the top are disposed so as to have the same positional relationship as that between the uppermost unit 10 and the unit 10 in the second position from the top. The number of units U10 constituting the unit stack 31 is not limited to four. The unit stack 31 may have any number of units U10 equal to or larger than two.

Thus, a second conductor film 15 of an upper unit U10 is electrically insulted from a first conductor film 14 of a lower unit U10 by the insulator film 31a. Each insulator film 31a is constituted of an epoxy resin, a phenolic resin, unsaturated polyester or polyimide for example, and its thickness is 1.5 to 4.5 μm for example.

The rear extreme ends of the first conductor film 14 and the second insulator film 17 of each unit U10 are exposed in the rear surface of the unit stack 31, while the front extreme end of the second conductor film 15 and the first insulator film 16 are exposed in the front surface of the stack unit 31.

The insulating cover film 32 is formed so as to continuously cover rectangular regions in the left, right, upper, and lower surfaces of the unit stack 31. Details of the insulating cover film 32 such as materials and thickness is the same as the insulating cover film 22 of the capacitor 20, therefore, explanation therefor is omitted here.

As shown in FIG. 21, the base conductor film 33 constituting the external terminal 35 on the front side is formed so as to continuously cover the front surface of the unit stack 31 and the left, right, upper, and lower surfaces of the front extreme ends of the insulating cover film 32. The base conductor film 33 constituting the external terminal 35 on the rear front side is formed so as to continuously cover the rear surface of the unit stack 31 and the left, right, upper, and lower surfaces of the rear extreme ends of the insulating cover film 32. The inner surface of the front surface of the base conductor film 33 is electrically connected to the front extreme end of the second conductor film 15 of each unit U10, and the inner surface of the rear front of the base conductor film 33 is electrically connected to the rear extreme end of the first conductor film 14. Details of the base conductor film such as materials and thickness is the same as the base conductor cover 23 of the capacitor 20, therefore, explanation therefor is omitted here.

As shown in FIG. 21, the surface conductor film 34 is formed so as to cover the front side of the base conductor film 33. The surface conductor film 34 constituting the external terminal 35 on the rear side is formed so as to cover the rear surface of the base conductor cover film 33. The inner surface of the rear front of the surface conductor film 34 is electrically connected to the front surface of the base conductor film 33. Details of the surface conductor film 34 such as materials and thickness is the same as the surface conductor film 24 of the capacitor 20, therefore, explanation, therefor is omitted here.

Figure 22:
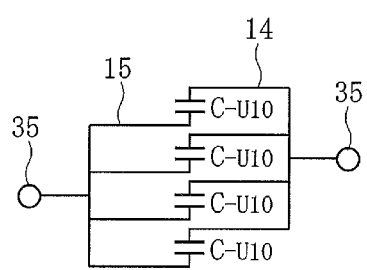
FIG. 22 shows the equivalent circuit diagram shown in FIG. 21.

FIG. 22 shows an equivalent circuit diagram of the capacitor C30. As illustrated, in the configuration shown by the equivalent circuit diagram of the capacitor C30, four capacitors of a capacitance C-U10 each corresponding to the unit U10 are connected in parallel between the pair of external terminals 35.

Figure 23:
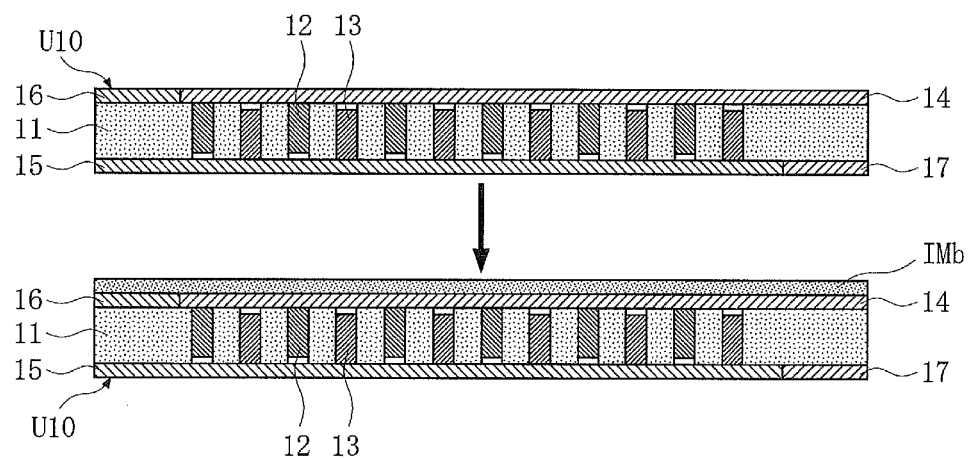
FIG. 23 is a diagram showing a method of manufacturing the capacitor shown in FIG. 21.
Figure 24:
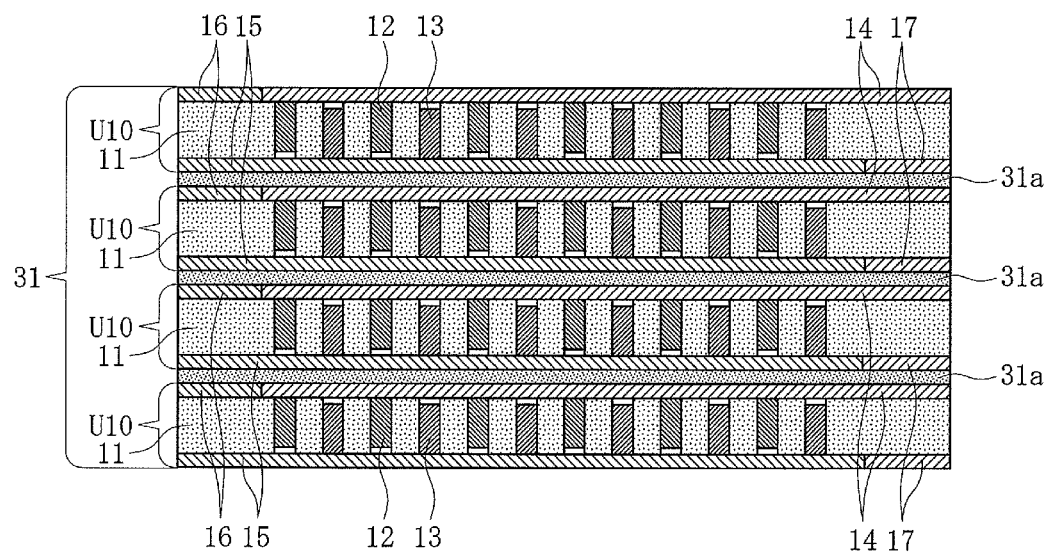
FIG. 24 is a diagram showing a method of manufacturing the capacitor shown in FIG. 21.
Figure 25:
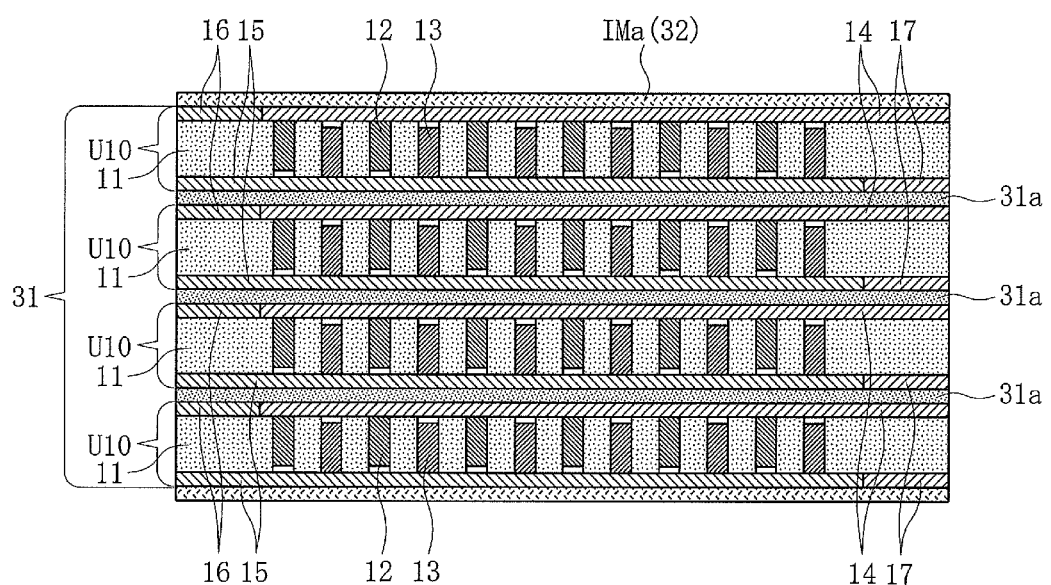
FIG. 25 is a diagram showing a method of manufacturing the capacitor shown in FIG. 21.

To manufacture the capacitor C30, the units U10 for forming the unit stack 31 are first prepared. Net, as shown in FIGS. 23 and 24, adjacent units U10 in the unit stack 31 are disposed so that the upper surfaces of the first conductor film 14 and the first insulator film 16, while an insulating material IMb is applied on the upper surfaces of the first conductor film 14 and the first insulator film 16 of the lower unit U10, are placed under the lower surfaces of the second conductor film 15 and the second insulator film 17, respectively Subsequently, as shown in FIG. 25, an insulator material 1Ma is applied to the left, right, upper, and lower surfaces of the unit stack 31 by using an applicator such as a roller applicator or a spray applicator, and the applied insulator material 1Ma is cured, thus making the insulating cover film 32.

Figure 26:
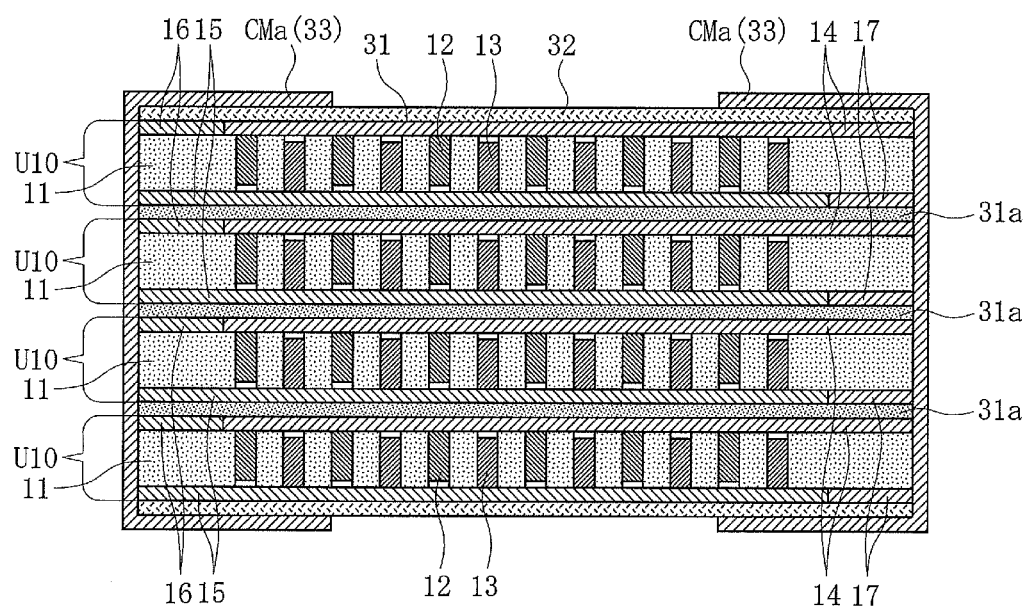
FIG. 26 is a diagram showing a method of manufacturing the capacitor shown in FIG. 21.
Figure 27:
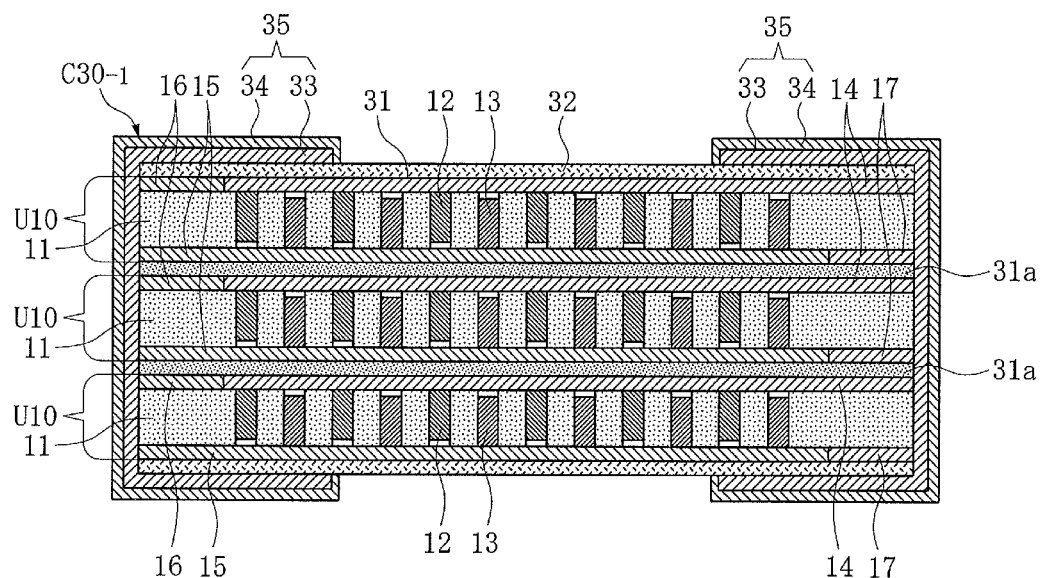
FIG. 27 is a sectional view of the capacitor according to another embodiment of the present invention.
Figure 28:
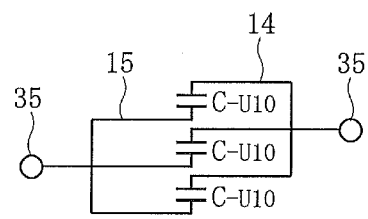
FIG. 28 shows the equivalent circuit diagram shown in FIG. 27.

Subsequently, as shown in FIG. 26, an electroconductive plastic material CMa (not cured yet) is applied to the front surface of the unit stack 31 and the front extreme ends of the left, right, upper, and lower surfaces of the insulating cover film 32. Also, the electroconductive plastic material CMa (not cured yet) is applied to the rear surface of the unit stack 31 and the rear extreme ends of the left, right, upper, and lower surfaces of the insulating cover film 32. Each electroconductive plastic material CMa is thereafter cured, thus making each base conductor film 33.

Subsequently, the surface conductor film 34 is made on the surfaces of the base conductor films 33 by electroplating processing. In a case where the number of layers in the surface conductor film 34 is tow or more, electroplating processings respectively made suitable for the layers are successively performed, thus obtaining the capacitor C30.

The unit U10 constructed as described above is simple in structure and therefore can be easily made and can be produced at a low cost. Also, the unit stack 21 can be obtained by only stacking and joining the units U10, and the capacitor having the stacked units U10 connected in parallel between the pair of external terminals 25 can be easily manufactured by forming the insulating cover film 22 and the pair of external terminals 25 on the unit stack 21.

As is apparent from the equivalent circuit diagram, the capacitor according to the embodiment of the present invention has a construction in which units U10 are connected in parallel to the number thereof. Therefore larger capacity of the capacitor can be achieved in correspondence with the number of units U10 connected in parallel. Also, the capacity of the capacitor can be easily changed by changing the number of units U10 included in the capacitor.

In the capacitor according to the embodiment of the present invention, because the left-right sizes of the first conductor film 14 and the second conductor film 15 of the unit U10 are equal to the left-right size of the dielectric plate, the area of contact between the first conductor film 14 of the uppermost unit U10 and the external terminal 25 and external terminal 35 on the rear side and the area of contact between the second conductor film 15 of the lowermost unit U10 and the external terminal 25 on the front side can be set sufficiently large to secure good electrical connections between the units U10, and the external terminal 25 and external terminal 35.

The left-right sizes of the first insulator film 16 and the second insulator film 17 are equal to the left-right size of the dielectric plate 11. In the cpacitor according to the embodiment of the present invention, therefore, insulation between the first conductor films 14 and the front side of the external terminal 25 and the external terminals 35, and the insulation between the second conductor films 15 and the rear side of the external terminal 25 and the external terminal 35 in each unit U10 can be achieved with reliability.

What is claimed is:

1. An individual capacitor forming unit comprising:
    a dielectric plate having a plurality of through holes formed in the thickness direction;
    a first conductor film formed on a region of an upper surface of the dielectric plate other than a front end portion of the upper surface;
    a first insulator film formed on the front end portion of the upper surface of the dielectric plate;
    a second conductor film formed on a region of the lower surface other than a rear end portion of the dielectric plate;
    a second insulator film formed on the rear end portion of the lower surface of the dielectric plate;

one or more first electrode rods disposed in some of the plurality of through holes of the dielectric plate, the first electrode rods being electrically connected to the first conductor film and electrically insulated from the second conductor film; and one or more second electrode rods disposed in the through holes of the dielectric plate in which the first electrode rod is not disposed, the second electrode rods being electrically connected to the second conductor film and electrically insulated from the first conductor film, wherein the first conductor film and the first insulator film form an upper outer surface of the individual capacitor forming unit, wherein the second conductor film and the second insulator film form a lower outer surface of the individual capacitor forming unit, and wherein either the upper outer surface or the lower outer surface, or both, of the individual capacitor forming unit is configured for direct contact with at least one outer surface of another adjacent individual capacitor forming unit to form a capacitor when electrically connected.

2. A capacitor comprising:

a unit stack is composed of a plurality of the individual capacitor forming units each formed according to claim 1 and stacked one on top of another, where first or second conductor films of adjacent individual capacitor forming units face each other and are electrically connected to each other, and wherein either the upper outer surface or the lower outer surface, or both, of each individual capacitor forming unit is in direct contact with at least one upper outer surface and/or lower outer surface of another adjacent individual capacitor forming unit in the unit stack;

an insulating cover film formed of an insulator material and formed on upper, lower, left and right surfaces of the unit stack;

a front external terminal connected to a front surface of the unit stack; and a rear external terminal connected to a rear surface of the unit stack, wherein the front ends of the second conductor films in the plurality of the individual capacitor forming units are exposed in the front surface of the unit stack, and the rear ends of the first conductor films in the plurality of the individual capacitor forming units are exposed in the rear surface of the unit stack;

wherein the front external terminal is electrically connected to the front ends of the second conductor films of the unit stack exposed in the front surface; and wherein the rear external terminal is electrically connected to the rear ends of the first conductor films of the unit stack exposed in the rear surface.

3. A capacitor comprising:

a unit stack is composed of a plurality of the individual capacitor forming units each formed according to claim 1 stacked one on top of another, where a first conductor film of an individual capacitor forming unit and a second conductor film of the adjacent individual capacitor forming unit face each other and are electrically insulated from each other, and wherein either the upper outer surface or the lower outer surface, or both, of each individual capacitor forming unit is in contact with at least one outer surface of another adjacent individual capacitor forming unit via an individual insulating layer in the unit stack;

an insulating cover film formed of an insulator material and formed on upper, lower, left and right surfaces of the unit stack;

a front external terminal connected to a front surface of the unit stack; and a rear external terminal connected to a rear surface of the unit stack, wherein the front ends of the second conductor films in the plurality of the individual capacitor forming units are exposed in the front surface of the unit stack, and the rear ends of the first conductor films in the plurality of the individual capacitor forming units are exposed in the rear surface of the unit stack;

wherein the front external terminal is electrically connected to the front ends of the second conductor films of the unit stack exposed in the front surface; and wherein the rear external terminal is electrically connected to the rear ends of the first conductor films of the unit stack exposed in the rear surface.

* * * * *